(12) United States Patent
Howard

(10) Patent No.: US 11,493,308 B1
(45) Date of Patent: Nov. 8, 2022

(54) VEHICLE ARMOR MATERIALS AND SYSTEMS

(71) Applicant: Newton Howard, Potomac, MD (US)

(72) Inventor: Newton Howard, Potomac, MD (US)

( * ) Notice: Subject to any disclaimer, the term of this patent is extended or adjusted under 35 U.S.C. 154(b) by 0 days.

(21) Appl. No.: 17/524,350

(22) Filed: Nov. 11, 2021

Related U.S. Application Data

(60) Provisional application No. 63/250,206, filed on Sep. 29, 2021.

(51) Int. Cl.
| | |
|---|---|
| *F41H 5/007* | (2006.01) |
| *F41H 7/04* | (2006.01) |
| *H02N 2/18* | (2006.01) |
| *H02K 11/00* | (2016.01) |

(52) U.S. Cl.
CPC ............... *F41H 5/007* (2013.01); *F41H 7/04* (2013.01); *H02K 11/0094* (2013.01); *H02N 2/18* (2013.01)

(58) Field of Classification Search
CPC .................................. F41H 5/007; F41H 7/04
See application file for complete search history.

(56) References Cited

U.S. PATENT DOCUMENTS

| | | | |
|---|---|---|---|
| 7,104,178 B1 * | 9/2006 | Zank | F41H 5/007 89/36.02 |
| 2009/0151549 A1 * | 6/2009 | Helander | F41H 5/007 89/36.02 |
| 2015/0316357 A1 * | 11/2015 | Carkner | F41H 5/0457 89/36.02 |

* cited by examiner

*Primary Examiner* — J. Woodrow Eldred
(74) *Attorney, Agent, or Firm* — Michael Schwartz

(57) ABSTRACT

Embodiments of the present systems and apparatus may provide vehicle armor materials and systems that generate electricity from impact and blast energy. For example, in an embodiment, a protective apparatus may comprise a layer of armor and a layer comprising a plurality of electrical generating devices abutting the layer of armor and configured so that energy applied to the layer of armor is transferred to the plurality of electrical generating devices causing the plurality of electrical generating device to generate electrical energy.

12 Claims, 4 Drawing Sheets

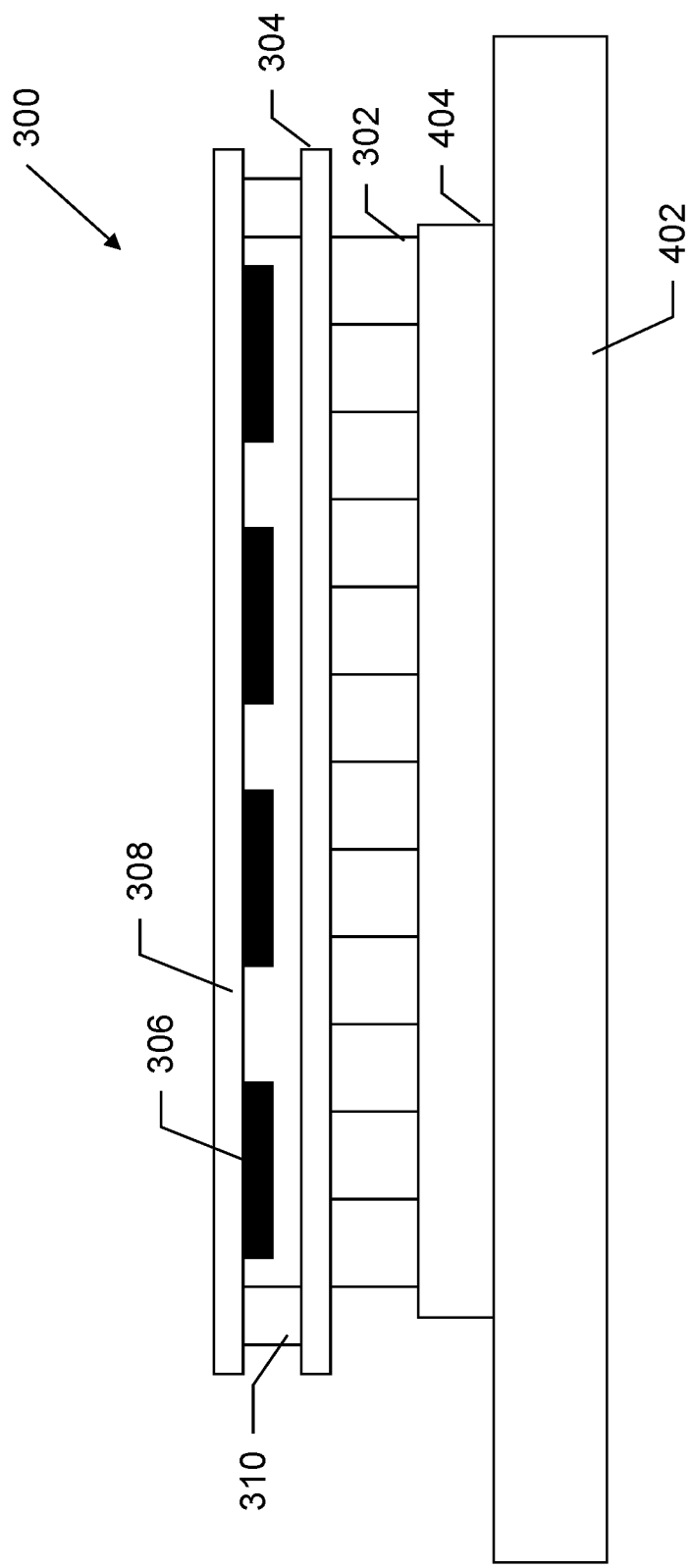

VEHICLE ARMOR MATERIALS AND SYSTEMS

CROSS-REFERENCE TO RELATED APPLICATIONS

This application claims the benefit of U.S. Provisional Application No. 63/250,206, filed Sep. 29, 2021, the contents of which are incorporated herein in their entirety.

BACKGROUND

The present invention relates to vehicle armor materials and systems that generate electricity from impact and blast energy.

The science of body armor materials may utilize a current understanding of relevant energy-absorbing mechanisms in fibers, fabrics, polymeric laminates and ceramics. Weaknesses in conventional techniques that use ceramic plates are that the energy absorbed is wasted through dissipation, as is the value of using cladding materials to improve the robustness, and multi-strike performance, of Hard Armor Plates.

Accordingly, a need arises for vehicle armor materials and systems that generate electricity from impact and blast energy.

SUMMARY

Embodiments of the present systems and apparatus may provide vehicle armor materials and systems that generate electricity from impact and blast energy.

The recent evolution, and maturity, of the Ultra High Molecular Weight Polyethylene and MWCNT fibers may enable a completely new style of system to evolve. Embodiments of the present techniques may utilize a stackable system of Hard Armor Plates sandwiched between a network of electrical generating devices. Such embodiments may absorb blast energy and convert that energy to electrical energy using a network of electrical generating devices. Embodiments may be protected by the fibers, fabrics, polymeric laminates and ceramics. Further, lighter, and therefore smaller, soft armor systems may be achieved with the additional value of using the blast energy to generate electrical energy.

For example, in an embodiment, a protective apparatus may comprise a layer of armor and a layer comprising a plurality of electrical generating devices abutting the layer of armor and configured so that energy applied to the layer of armor is transferred to the plurality of electrical generating devices causing the plurality of electrical generating device to generate electrical energy.

In embodiments, the layer of armor may comprise at least one of metals, ceramics, and composite plates. The layer comprising a plurality of electrical generating devices may comprise at least one of dynamos, generators, alternators, and piezo-electric devices. The protective apparatus may be used in at least one of a vehicle, a vessel, an aircraft, a structure, and personal protective equipment. The apparatus may further comprise a plurality of layers of armor and a plurality of layers each comprising a plurality of electrical generating devices, each layer comprising a plurality of electrical generating devices sandwiched between two layers of armor. Each layer of armor may comprise at least one of metals, ceramics, and composite plates. Each layer comprising a plurality of electrical generating devices may comprise at least one of dynamos, generators, alternators, and piezo-electric devices. The protective apparatus may be used in at least one of a vehicle, a vessel, an aircraft, a structure, and personal protective equipment.

In an embodiment, a protective system may comprise a plurality of layers of armor, a plurality of layers each comprising a plurality of electrical generating devices abutting the layer of armor and configured so that energy applied to an outer layer of armor is transferred to the plurality of layers of electrical generating devices causing the plurality of electrical generating device to generate electrical energy, and energy storage apparatus configured to store electrical energy generated by the plurality of electrical generating devices.

In embodiments, the system may further comprise energy conditioning circuitry configured to condition the electrical energy generated by the plurality of electrical generating devices before storage of the electrical energy generated by the plurality of electrical generating devices by the energy storage apparatus. The system may further be configured to supply energy to at least one energy consuming system. Each layer of armor may comprise at least one of metals, ceramics, and composite plates. Each layer comprising a plurality of electrical generating devices may comprise at least one of dynamos, generators, alternators, and piezo-electric devices. The protective apparatus may be used in at least one of a vehicle, a vessel, an aircraft, a structure, and personal protective equipment.

BRIEF DESCRIPTION OF THE DRAWINGS

The details of the present invention, both as to its structure and operation, can best be understood by referring to the accompanying drawings, in which like reference numbers and designations refer to like elements.

FIG. 4 is side view of the exemplary apparatus shown in FIG. 3 according to embodiments of the present systems and apparatus.

DETAILED DESCRIPTION

Embodiments of the present systems and apparatus may provide vehicle armor materials and systems that generate electricity from impact and blast energy.

The recent evolution, and maturity, of the Ultra High Molecular Weight Polyethylene and MWCNT fibers may enable a completely new style of system to evolve. Embodiments of the present techniques may utilize a stackable system of Hard Armor Plates sandwiched between a network of electrical generating devices. Such embodiments may absorb blast energy and convert that energy to electrical energy using a network of electrical generating devices. Embodiments may be protected by the fibers, fabrics, polymeric laminates and ceramics. Further, lighter, and therefore smaller, soft armor systems may be achieved with the additional value of using the blast energy to generate electrical energy.

Figure 1:
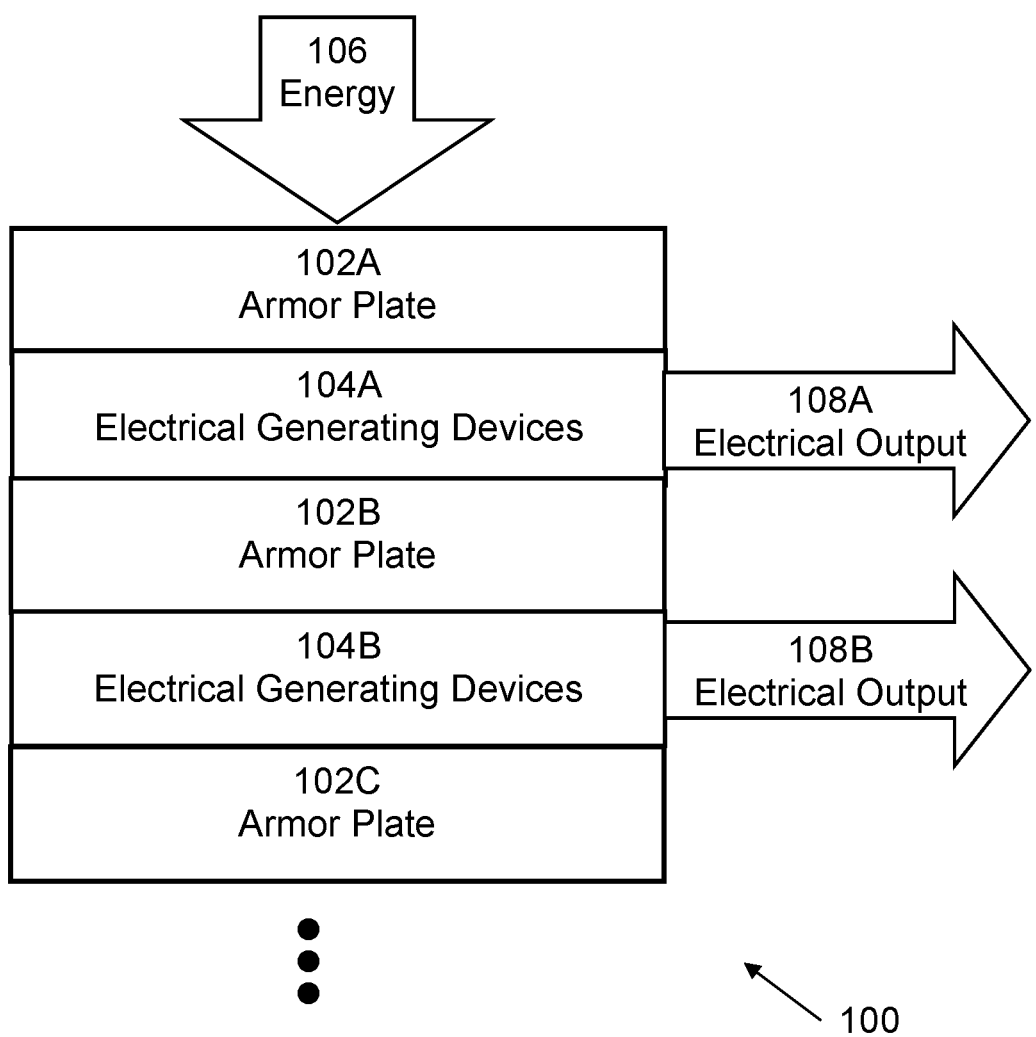
FIG. 1 illustrates an exemplary block diagram of an armor system according to embodiments of the present systems and apparatus may be implemented.

An exemplary block diagram of an armor system 100 according to embodiments of the present systems and apparatus may be implemented, is shown in FIG. 1. In this example, armor system 100 may include a plurality of hard armor layers 102A-C and a plurality of electrical generating devices 104A-B sandwiched between armor layers 102A-C. When external energy, such as blast or impact energy is applied to a surface of armor system 100, such as armor layer 102A, the energy 106 may be transmitted by armor layer 102A to electrical generating devices 104A, which may absorb a portion of the energy and convert it to an output 108A of electrical energy. Remaining energy may be transmitted by armor layer 102B to electrical generating devices 104B, which may absorb a portion of the remaining energy and convert it to an output 108B of electrical energy. This may be repeated for each layer of armor layer and electrical generating devices present in armor system 100.

Embodiments may be used with any type of armor protection and at any scale. For example, embodiments may be used with armor on vehicles, vessels, aircraft, structures, etc., as well as at smaller scale, such as personal protective equipment, such as body armor. The armor may include hard armor made of metals, ceramics, high-performance composite plates, which may include fibers, fabrics, polymeric laminates and ceramics, etc., and other hard materials. Electrical generating devices may include devices such as dynamos, generators, alternators, piezo-electric devices, or any other device capable of converting the kinetic energy of the blast or impact into electrical energy. Electrical generating devices may be of a single type or of mixed types for each system, a single type or of mixed types for each layer, or any other combination of types. Electrical generating devices may be of suitable size for the application. For example, for use with an armored vehicle, the electrical generating devices may be sized accordingly, while for use with a vessel, the electrical generating devices may be sized to be significantly larger, and for use with personal protective equipment, such as body armor, the electrical generating devices may be sized to be significantly smaller.

Figure 2:
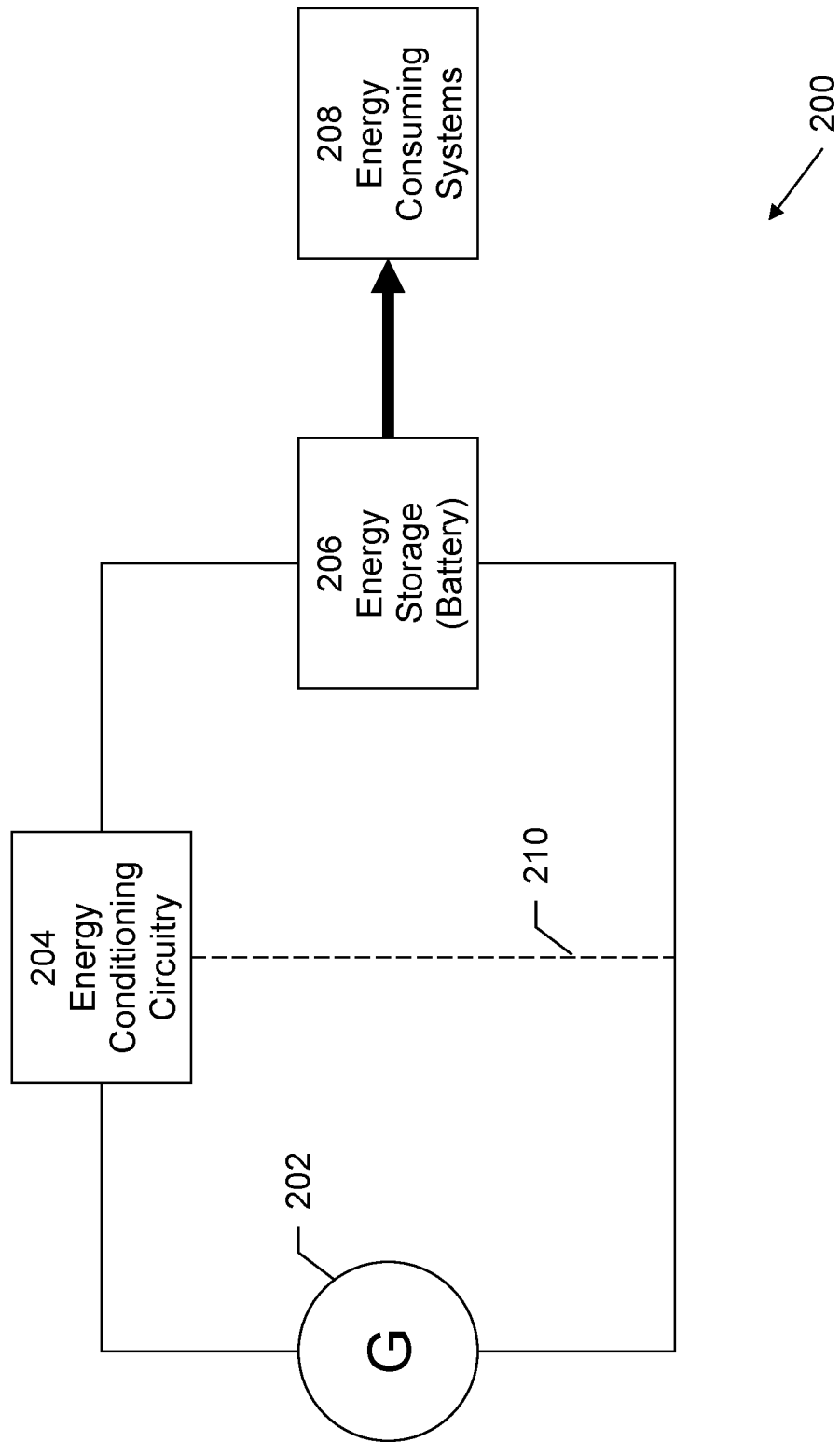
FIG. 2 is an exemplary electrical schematic diagram of an armor system according to embodiments of the present systems and apparatus.

An exemplary electrical schematic diagram of an armor system 200 according to embodiments of the present systems and apparatus may be implemented, is shown in FIG. 2. System 200 may include a plurality of electrical generating devices 202, which may absorb a portion of applied blast or impact energy and convert it to electrical energy. The plurality of electrical generating devices 202 may be connected in series, in parallel, or in a combination of series and parallel so as to obtain a desired output voltage. The electrical output from electrical generating devices 202 may be connected to energy conditioning circuitry 204, which may convert the incoming electrical energy to have desired voltage, waveform, and/or noise characteristics. The conditioned electrical energy may be applied to energy storage 206, which may store the electrical energy for use. Energy storage 206 may include a battery or other electrical energy storage device, such as a capacitor, a flywheel generator, etc. The electrical energy stored in energy storage 206 may be used by energy consuming systems 208, which may include electrical power systems and electronic systems, as desired. The design of energy conditioning circuitry 204 is well within the knowledge of one of ordinary skill in the art and may depend on a number of engineering factors, such as the voltage, waveform, and/or noise characteristics of the electrical energy output from electrical generating devices 202 and on the voltage, waveform, and/or noise requirements of energy storage 206 and/or energy consuming systems 208. Accordingly, in some embodiments energy conditioning circuitry 204 may include a ground connection 210, while in some embodiments energy conditioning circuitry 204 may not include a ground connection.

Figure 3:
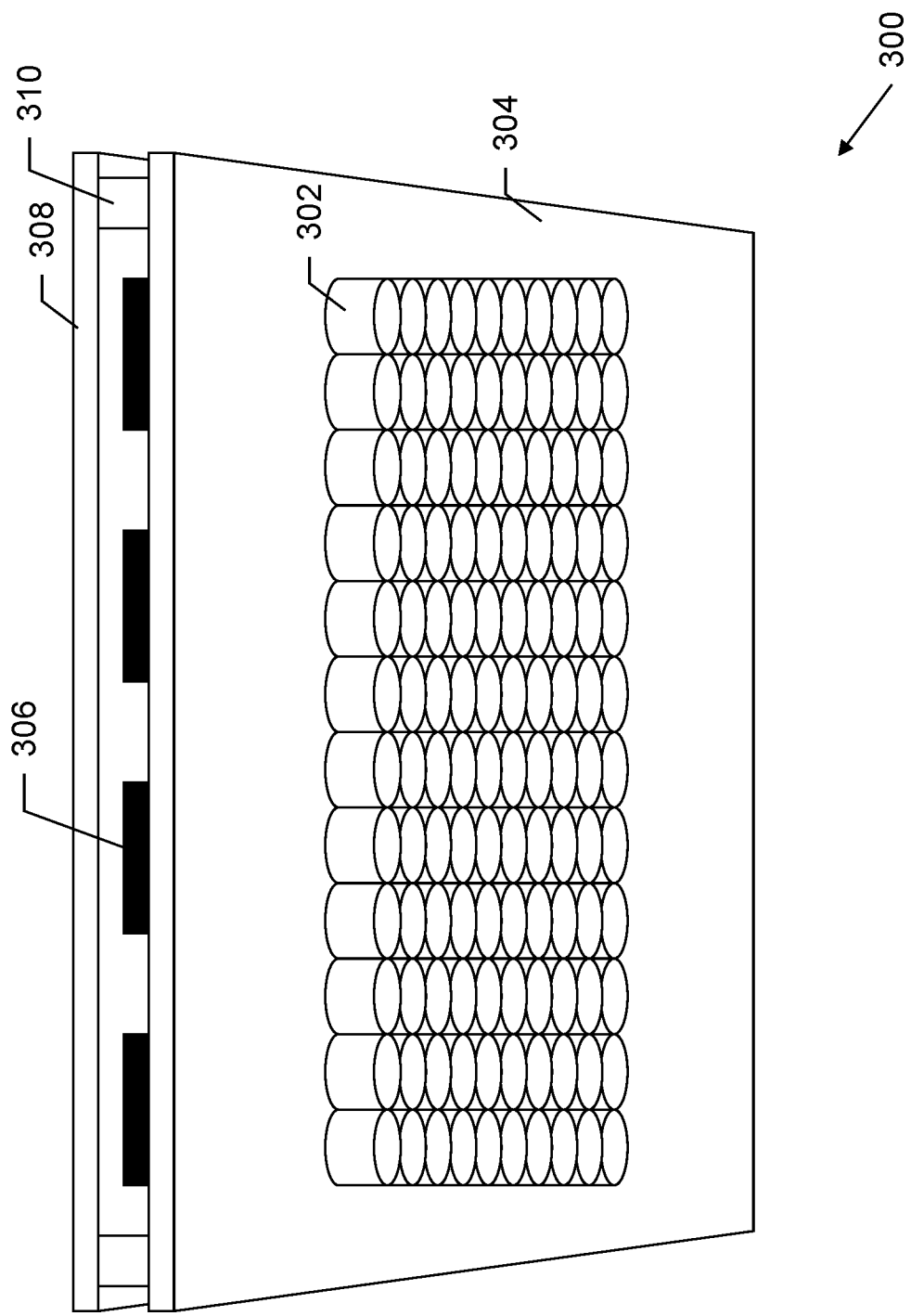
FIG. 3 is an example of operation of embodiments of an apparatus that may be included in embodiments of the present systems and apparatus.

Exemplary embodiments of an apparatus 300 that may be included in embodiments of the present systems and apparatus is shown in FIG. 3. Apparatus 300 may include a plurality of electrical generating devices 302, which may be mounted on a base 304. The electrical output electrical generating devices 302 may be connected to energy conditioning circuitry 306, which in the embodiments shown may be mounted on based 304 or which may be mounted on a circuit board 308 attached to based 304 using mounting hardware 310.

A side view of exemplary apparatus 300 is shown in FIG. 4. Apparatus 300 may include a plurality of electrical generating devices 302, which may be mounted on a base 304. The electrical output electrical generating devices 302 may be connected to energy conditioning circuitry 306, which in the embodiments shown may be mounted on based 304 or which may be mounted on a circuit board 308 attached to based 304 using mounting hardware 310. In this view armor layer 402 is shown adjacent to electrical generating devices 302, with an energy transfer plate 404 abutting both armor layer 402 and electrical generating devices 302. Energy transfer plate 404 may transfer blast and/or impact energy from armor layer 402 to electrical generating devices 302.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A protective apparatus comprising:
   a layer of armor; and
   a layer comprising a plurality of electrical generating devices abutting the layer of armor and configured so that energy applied to the layer of armor is transferred to the plurality of electrical generating devices causing the plurality of electrical generating device to generate electrical energy, wherein the layer comprising a plurality of electrical generating devices comprises at least one of dynamos, generators, and alternators.

2. The apparatus of claim 1, wherein the layer of armor comprises at least one of metals, ceramics, and composite plates.

3. The apparatus of claim 1, wherein the protective apparatus is used in at least one of a vehicle, a vessel, an aircraft, a structure, and personal protective equipment.

4. The apparatus of claim 1, further comprising a plurality of layers of armor and a plurality of layers each comprising a plurality of electrical generating devices, each layer comprising a plurality of electrical generating devices sandwiched between two layers of armor.

5. The apparatus of claim 4, wherein each layer of armor comprises at least one of metals, ceramics, and composite plates.

6. The apparatus of claim 5, wherein each layer comprising a plurality of electrical generating devices comprises at least one of dynamos, generators, alternators, and piezoelectric devices.

7. The apparatus of claim 1, wherein the protective apparatus is used in at least one of a vehicle, a vessel, an aircraft, a structure, and personal protective equipment.

8. A protective system comprising:
   a plurality of layers of armor;
   a plurality of layers each comprising a plurality of electrical generating devices abutting the layer of armor and configured so that energy applied to an outer layer of armor is transferred to the plurality of layers of electrical generating devices causing the plurality of electrical generating device to generate electrical energy, wherein each layer comprising a plurality of electrical generating devices comprises at least one of dynamos, generators, and alternators; and energy storage apparatus configured to store electrical energy generated by the plurality of electrical generating devices, and further configured to supply electrical energy to energy consuming systems including electrical power systems.

9. The system of claim 8, further comprising energy conditioning circuitry configured to condition the electrical energy generated by the plurality of electrical generating devices before storage of the electrical energy generated by the plurality of electrical generating devices by the energy storage apparatus.

10. The system of claim 9, wherein the system is further configured to supply energy to at least one energy consuming system.

11. The apparatus of claim 10, wherein each layer of armor comprises at least one of metals, ceramics, and composite plates.

12. The apparatus of claim 8, wherein the protective apparatus is used in at least one of a vehicle, a vessel, an aircraft, a structure, and personal protective equipment.

* * * * *